(12) United States Patent
Garnett et al.

(10) Patent No.: US 11,775,245 B1
(45) Date of Patent: Oct. 3, 2023

(54) CONSISTENT REPRESENTATIVE SCREEN SHARING

(71) Applicant: INTERNATIONAL BUSINESS MACHINES CORPORATION, Armonk, NY (US)

(72) Inventors: Brent William Garnett, Westford, MA (US); Yahel Nachum, Northborough, MA (US); Chowdhury Annur, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/662,505

(22) Filed: May 9, 2022

(51) Int. Cl.
| | | |
|---|---|---|
| *G06F 3/14* | (2006.01) | |
| *H04L 29/06* | (2006.01) | |
| *H04N 7/14* | (2006.01) | |
| *H04N 7/15* | (2006.01) | |
| *H04L 65/403* | (2022.01) | |

(52) U.S. Cl.
CPC .......... *G06F 3/1454* (2013.01); *H04L 65/403* (2013.01); *H04N 7/147* (2013.01); *H04N 7/152* (2013.01)

(58) Field of Classification Search
CPC ..... G06F 3/14; G06F 3/1454; H04L 65/1066; H04L 65/1069; H04L 65/1083; H04L 65/1094; H04L 65/1095; H04L 65/40; H04L 65/401; H04L 65/4015; H04L 65/403
See application file for complete search history.

(56) References Cited

U.S. PATENT DOCUMENTS

| | | | |
|---|---|---|---|
| 7,383,495 B2 | 6/2008 | Dontcheva | |
| 9,007,426 B2 | 4/2015 | Kramarenko | |
| 9,037,735 B1 | 5/2015 | Fallows | |
| 10,402,375 B2 | 9/2019 | Jain | |
| 2005/0192052 A1* | 9/2005 | Tenhunen | H04L 65/1101 455/552.1 |
| 2008/0137598 A1* | 6/2008 | Bouvier | H04L 65/1069 370/329 |

(Continued)

OTHER PUBLICATIONS

Apple, "Apple Remote Desktop," Technical Specs, Accessed: Mar. 17, 2022, https://www.apple.com/remotedesktop/ specs.html, 3 pages.

(Continued)

*Primary Examiner* — Boris D Grijalva Lobos
(74) *Attorney, Agent, or Firm* — Daniel J. Hakimi (57) ABSTRACT

According to one embodiment, a method, computer system, and computer program product for consistent representative screen sharing is provided. The embodiment may include initializing data pertaining to a video-enabled call, wherein the data includes negotiation criteria and screen specifications corresponding to a screen corresponding to each of a plurality of devices participating in the call. The embodiment may also include negotiating a consistent display size according to negotiation criteria and consistent with screen specifications. The embodiment may further include sizing a display area to an actual display size on one or more screens corresponding to each of two or more devices from the plurality of devices participating in the call according to the negotiated display size.

17 Claims, 6 Drawing Sheets

(56) References Cited

U.S. PATENT DOCUMENTS

| | | | | |
|---|---|---|---|---|
| 2010/0198946 | A1* | 8/2010 | Dowlatkhah | H04L 65/1094 709/231 |
| 2011/0219331 | A1* | 9/2011 | DeLuca | G06F 9/451 715/810 |
| 2013/0073965 | A1 | 3/2013 | Sik | |
| 2013/0263045 | A1 | 10/2013 | Minematsu | |
| 2014/0125755 | A1* | 5/2014 | Thomas | H04N 7/152 348/14.09 |
| 2014/0254367 | A1* | 9/2014 | Jeong | H04W 28/0205 370/233 |
| 2015/0002609 | A1* | 1/2015 | Navon | H04N 7/142 348/14.07 |
| 2015/0208037 | A1* | 7/2015 | Maurice | H04L 65/70 348/14.09 |
| 2018/0217854 | A1* | 8/2018 | Lee | H04N 7/0122 |

OTHER PUBLICATIONS

Author Unknown, "What is the Recommended Screen Resolution for Optimal Viewing in a Webex Meeting?," Webex Help Center, Oct. 18, 2021, https://help.webex.com/en-us/article/WBX57619/What-is-the-Recommended-Screen-Resolution-for-Optimal-Viewing-in-a-Webex-Meeting?, 2 pages.

Bertolotto et al., "Progressive Transmission of Vector Map Data over the World Wide Web," GeoInformatica 5.4 (2001), pp. 345-373.

ITU-T Study Group 8, "Data Protocols for Multimedia Conferencing," Jul. 3, 1996, ITU-T, International Telecommunication Union, T.120, https://www.itu.int/rec/dologin_pub.asp?lang=e&id=T-REC-T.120-199607-S!!PDF-E&type=items, 24 pages.

Mell et al., "The NIST Definition of Cloud Computing", National Institute of Standards and Technology, Special Publication 800-145, Sep. 2011, 7 pages.

Microsoft, "Remote Desktop Protocol," Aug. 19, 2020, Microsoft Docs, https://docs.microsoft.com/en-us/windows/win32/termserv/remote desktop-protocol, 4 pages.

Webex Team, "Best screen sharing practices for small businesses," Webex Blog, Jul. 25, 2019, https://blog.webex.com/video-conferencing/best-screen-sharing-practices-for-small-businesses/, 5 pages.

Yang et al. "Implicit Transformer Network for Screen Content Image Continuous Super-Resolution," 35th Conference on Neural Information Processing Systems (NeurIPS 2021), https://papers.neurips.cc/paper/2021/file/6e7d5d259be7bf56ed79029c4e621f44-Paper.pdf, 12 pages.

* cited by examiner

CONSISTENT REPRESENTATIVE SCREEN SHARING

BACKGROUND

The present invention relates generally to the field of computing, and more particularly to video telecommunication.

Video telecommunication is a field of telecommunications that includes web conferencing, video chat, and video messaging. Video telecommunication includes the physical technologies, standards, protocols, and software that allows users to share video across great distances to a variety of devices. Video may include live video recorded by a camera, a live recording of a computing device's display, or pre-recorded video.

SUMMARY

According to one embodiment, a method, computer system, and computer program product for consistent representative screen sharing is provided. The embodiment may include initializing data pertaining to a video-enabled call, wherein the data includes negotiation criteria and screen specifications corresponding to a screen corresponding to each of a plurality of devices participating in the call. The embodiment may also include negotiating a consistent display size according to negotiation criteria and consistent with screen specifications. The embodiment may further include sizing a display area to an actual display size on one or more screens corresponding to each of two or more devices from the plurality of devices participating in the call according to the negotiated display size.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to video telecommunication. The following described exemplary embodiments provide a system, method, and program product to, among other things, display images representative of one device's screen on a series of other screens in a visually consistent manner. Therefore, the present embodiment has the capacity to improve the technical field of video telecommunication by allowing video conferencing services to display a consistent image of a given screen to multiple users simultaneously.

As previously described, video telecommunication is a field of telecommunications that includes web conferencing, video chat, and video messaging. Video telecommunication includes screen sharing, where a computing device broadcasts a live recording of its display to be displayed on other devices. These screens may carry different specifications, such as aspect ratio, pixel width and height, and physical width and height.

Furthermore, a presenter in a screen sharing context may only wish to share a portion of a display. The portion of the display shared may be measured as a fraction of a screen, as a size in pixels, or as a physical size measured in units such as inches or centimeters. Many solutions offer each viewer control over the portion of the screen taken up by the shared displayed area. However, current solutions often display the displayed area at different sizes across different devices.

Specifically, current solutions may show a displayed area that takes up the full screen of a presenter's device on only a portion of the viewer's device. Other solutions may show a displayed area as being four inches wide on a presenter's device, but five inches wide on a viewer's device. This inconsistency can create miscommunications, or conflicting perspectives as to scale or proportion. As such, it may be advantageous to, among other things, negotiate and fix the size of the shared displayed area according to one or more measurements, in order to provide users with a consistent visual experience.

According to at least one embodiment, computing devices may interact with one another, or with a central server, according to a standard protocol. The devices may begin such interaction by initializing call variables, such as negotiation criteria and the specifications of the computing devices participating of the call. The devices may then negotiate new call variables based on the initialized variables, such as a consistent display size for the content to be displayed across all devices. This consistent display size may change over the course of a call. Finally, the devices may resize their respective displays according to the negotiated consistent display size, providing users a consistent experience.

A consistent display size may be represented by a variety of measures. For example, a consistent display size may be a percentage of screen height, screen width, or screen area, a height or width in pixels, or a height or width in a physical size, measured, for example, by inches or centimeters. By ensuring that shared screen areas are the same size, the shared areas may ensure that particular items on the screen are the same size, either in absolute terms or relative to one another.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for consistent representative screen sharing by initialization, negotiation, and sizing.

Figure 1:
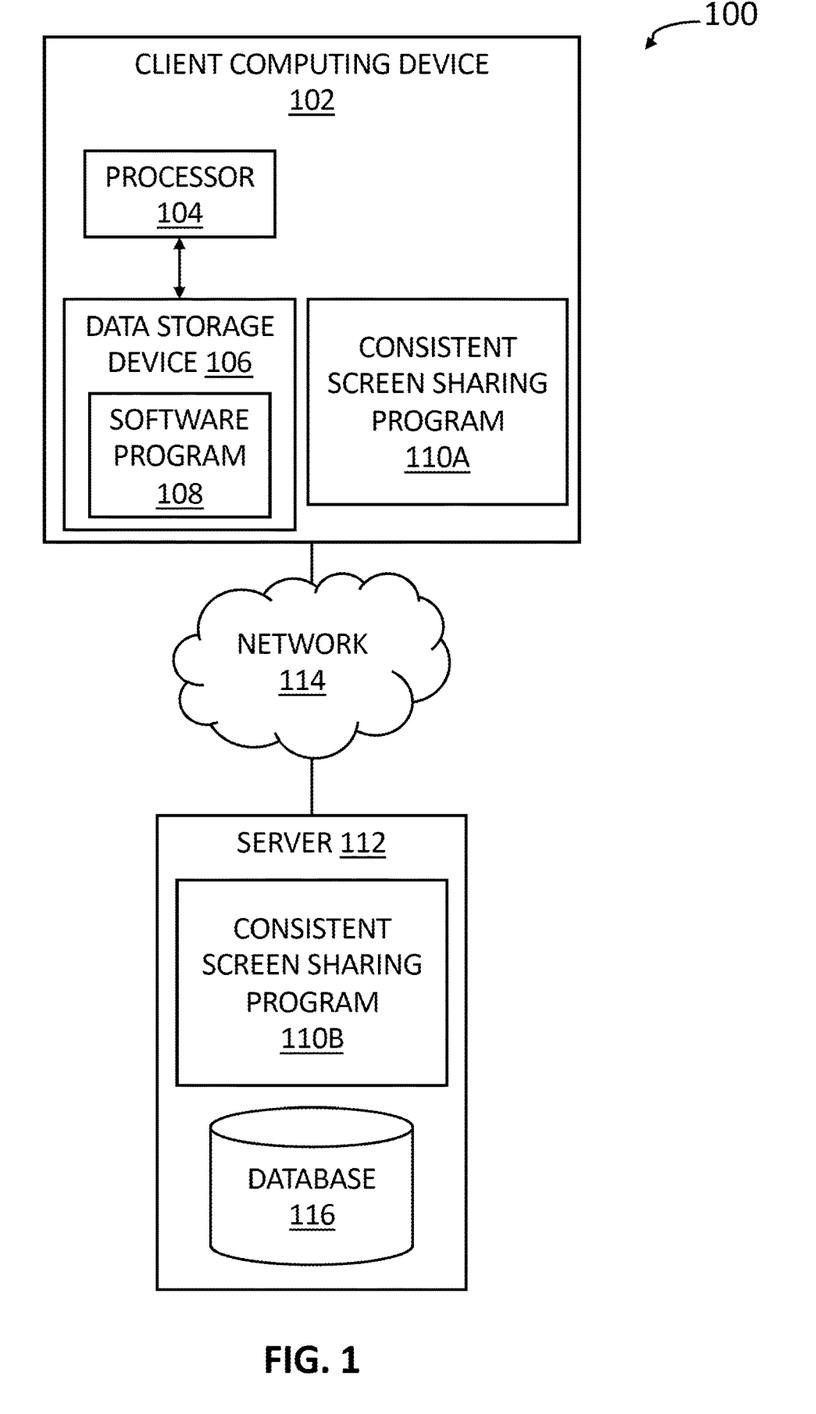
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, and a server 112, interconnected via a communication network 114. According to at least one implementation, the networked computer environment 100 may include a plurality of client computing devices 102, and servers 112, of which only one of each is shown for illustrative brevity. Additionally, in one or more embodiments, the client computing device 102 and server 112 may each individually host a consistent screen sharing program 110A, 110B. In one or more other embodiments, the consistent screen sharing program 110A, 110B may be partially hosted on both client computing device 102 and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a consistent screen sharing program 110A and communicate with the server 112 via the communication network 114, in accordance with one embodiment of the invention. In one or more other embodiments, client computing device 102 may be, for example, a mobile device, a telephone, a personal digital assistant, a vehicle, a netbook, a laptop computer, a tablet computer, a desktop computer, a television, a dedicated video chat device, or any type of computing device capable of running a program and accessing a network. As previously described, one client computing device 102 is depicted in FIG. 1 for illustrative purposes, however, any number of client computing devices 102 may be utilized. As will be discussed with reference to FIG. 4, the client computing device 102 may include internal components 402a and external components 404a, respectively.

The server computer 112 may be a laptop computer, netbook computer, personal computer (PC), a desktop computer, a vehicle, a television, a dedicated video chat device, or any programmable electronic device or any network of programmable electronic devices capable of hosting and running a consistent screen sharing program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the consistent screen sharing program 110A, 110B may be capable of initializing data regarding a call, including negotiation criteria and technical specifications of screens corresponding to the devices participating in the call. Negotiation criteria may include height, width, or a combination thereof, measured in pixels, in physical length, or as portions of the screen. Screen specifications may include height, width, corner radius, measured in pixels or in physical dimensions. The consistent screen sharing program 110A, 110B may further negotiate a consistent display size for participating devices according to the negotiation criteria, and in light of the screen specifications. The consistent screen sharing program 110A, 110B may further set the size of the area displaying the screen sharing feed to the negotiated consistent display size. The consistent screen sharing method is explained in further detail below with respect to FIG. 2.

Figure 2:
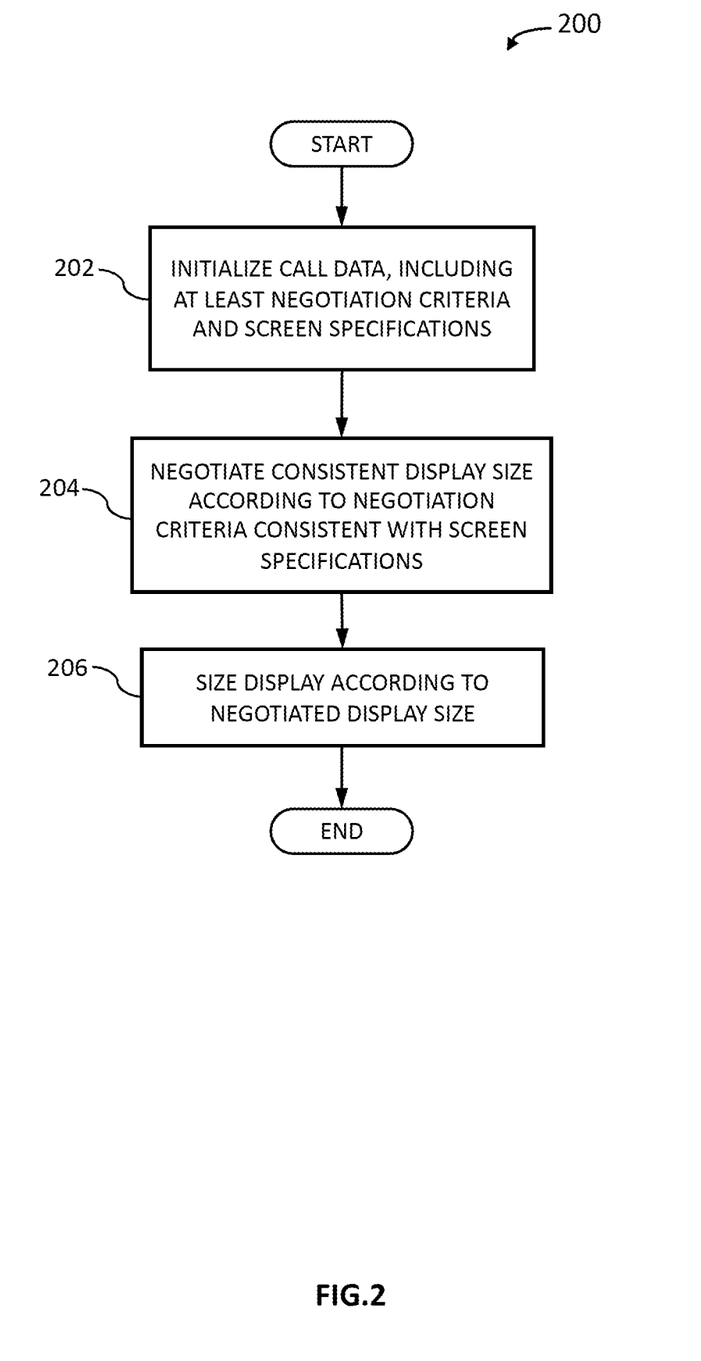
FIG. 2 illustrates an operational flowchart for a process for consistent representative screen sharing according to at least one embodiment.

Referring now to FIG. 2, an operational flowchart illustrating a process for consistent screen sharing 200 is depicted according to at least one embodiment. At 202, the consistent screen sharing program 110A, 110B initializes call data including at least negotiation criteria and technical specifications of screens corresponding to devices participating in a call. Initialization may include collection of other relevant data by the consistent screen sharing program 110A, 110B by an opt in procedure, as well as processing of that data to create new data to help set up and optimize the call. Initialization may also include an algorithmic selection or generation of call variables, such as an automatically generated unique call identifier or an encryption key.

Negotiation criteria may include a width, height, or area of a screen. Negotiation criteria may further specify a measurement type, such as a portion of the screen, a size in pixels, or a physical size. Negotiation criteria may further specify that aspect ratio must be maintained, or that screen position must be maintained. Negotiation criteria may include more than one dimension or more than one measurement. For example, negotiation criteria may indicate that negotiation should determine a consistent height measurement in inches and width measurement in inches to be displayed. Alternatively, negotiation criteria may specify that the negotiation should determine a consistent percentage of screen width and percentage of screen height to be displayed, and further state that position should be maintained but aspect ratio need not be maintained. Alternatively, negotiation criteria may specify that negotiation should determine a consistent percentage of screen width be displayed at a consistent aspect ratio. In at least one embodiment, negotiation criteria may further include maintaining a consistent frame rate, or correcting for potential disparities in brightness or color.

A screen's technical specifications may include the screen's height and width in pixels and physical dimensions, measured in, for example, inches or centimeters. Technical specifications may further include a corner radius of a screen with rounded corners, data describing the cutout of a screen with a camera cutout, or data describing the curves or folds in a curved or foldable display. Technical specifications may further include information regarding dead pixels or screen burn-in. Alternatively, a technical specifications may be described in terms of a map of working pixels with physical dimensions. In at least one embodiment, technical specifications may include the dimensions of a screen's largest uninterrupted rectangular area. In at least one embodiment, a non-rectangular screen may be treated as rectangular according to known methods, such as by utilizing an operating system standard API, using the largest uninterrupted rectangular area, or using the full height and width of the screen.

In at least one embodiment, technical specifications may further include other data such as brightness data, color correction data, or frame rate data. Color correction data may include information that may be used to determine how a screen displays colors, including data about any color correction filters currently affecting the screen, such as a nighttime filter. Frame rate data may include the maximum frame rate of the device, the current frame rate of the device, or information about a variable frame rate feature for the device. Technical specifications may also include a type of screen, such as whether a screen is an LED, OLED, LCD, or other specific type of screen, or other screen features, such as high dynamic range. Technical specifications may further include battery-related data, such as a projection of how much longer a screen may be able to maintain a given level of brightness.

In at least one embodiment, initialization may collect other relevant data. For example, initialization identify one or more predetermined presenters, calendar information about a call's scheduled duration, or time zone information for participants. A presenter may be, for example, a predetermined user selected manually, a user sharing her screen, a user speaking on audio, or an authoritative user guiding the direction of the call.

In at least one embodiment, the consistent screen sharing program 110A, 110B may re-initialize at least one of the above variables. Re-initialization may occur when a user connects to or disconnects from a call, when a presenter changes, or when technical specifications change. For example, if a new user would like to present, re-initialization may identify the new user as a presenter. Alternatively, if a device's screen rotation feature is activated, modifying that screen's layout from a horizontal layout to a vertical layout, re-initialization may modify the technical specifications describing that screen's size to indicate the vertical layout. Alternatively, if a device's nighttime filter becomes enabled, re-initialization may signal for the consistent screen sharing program 110A, 110B to renegotiate color correction variables, or to modify the way color is displayed on the device for which the nighttime filter becomes enabled.

In a further embodiment, a call may include further participants who use devices without screens, or devices that do not participate in consistent screen sharing. For example, a user may join a call by dialing a call-in number via rotary phone. Alternatively, a user may join a call from a software client that does not support screen sharing, or does not support consistent screen sharing. If, for example, a call participant is joining by dialing a call-in number via rotary phone, initialization may not initialize for that participant. Alternatively, initialization may note that that participant is joining via rotary phone and will not participate in consistent screen sharing.

In an alternate embodiment, initialization may initialize more than one set of negotiation criteria, suggesting that more than one display area may be shared, or that one display area may be shared more than once according to different negotiation criteria.

In yet another embodiment, negotiation criteria may be a more abstract method for ensuring a consistent user experience of the shared screen data. For example, negotiation criteria may indicate an algorithm to be used for negotiation.

Then, at 204, the consistent screen sharing program 110A, 110B negotiates a consistent display size for the call according to negotiation criteria and consistent with screen specifications. Negotiation may include determining a display size to maintain consistently across devices, or as consistently as possible across devices. Negotiation may further include determining other consistent variables such as display position, brightness, or color correction variables. Negotiation may further include determining other variables that assist in the function and optimization of the call. Negotiation may determine that the consistent display size for the call should follow a presenter's selected display size.

For example, if negotiation criteria indicate that negotiation should determine a consistent height measurement in inches and width measurement in inches to be displayed, negotiation may determine the exact height and width measurements in inches for the shared display area. More specifically, if participating devices include Device A, with pixel width 1920, pixel height 1080, physical width 13.44 inches, and physical height 7.56 inches; Device B, with pixel width 2340, pixel height 1080, physical width 4.92 inches, and physical height 2.27 inches; and Device C, with pixel width 3120, pixel height 1440, physical width 6.09 inches, physical height 2.81 inches; then the negotiated consistent height measurement may be 4.92 inches, and the negotiated consistent width may be 2.27 inches. In an alternate embodiment, the negotiated physical size may be above the physical size of the smallest device.

Further building on the above example, if device B has low battery, and projects one hour of remaining battery life at 320 nits of brightness, and if a call is scheduled to last one hour, negotiation may determine that brightness should be set to 300 nits across all devices.

In yet another embodiment, if negotiation criteria indicate a weighted or algorithmic approach to ensuring a consistent user experience of the shared screen data, negotiation may follow such a method. For example, if negotiation criteria indicate a specific algorithm, negotiation may use that algorithm. More specifically, an algorithm may weigh different factors that may relate to consistency of user experience, including a relative portion of the screen size, a physical size, maintaining an aspect ratio, the location of a camera cutout in a display with a camera cutout, or the apparent location of sensitive information such as text in shared display data. More specifically, if shared display data appears to contain text, negotiation criteria may indicate, and negotiation may negotiate, a size on each device that ensures all relevant text is legible on even the smallest and least pixel-dense devices.

In at least one embodiment, the consistent screen sharing program 110A, 110B may renegotiate call variables. Renegotiation may, for example, be triggered manually; whenever re-initialization occurs; or whenever the presenter modifies the size of an application window being shared. Renegotiation may, for example, determine a new display size, display position, brightness standard, or color correction variable. In at least one embodiment, renegotiation may trigger one or more devices participating in a call to re-size the display area showing the shared screen data.

In an alternate embodiment, negotiation may determine more than one display size for the call. For example, negotiation may determine one display size for devices in a landscape format, and an alternate display size for devices in a portrait format. Alternatively, negotiation may determine one size for devices with screen size under 7 inches diagonally, another size for devices with screen size between 7 and 20 inches diagonally, and another size for devices above 20 inches diagonally.

In a further embodiment, negotiation may negotiate multiple display sizes to be displayed on each device according to multiple sets of negotiation criteria. For example, if negotiation criteria indicate that one display area should be sized according to a portion of screen width and another display area should be sized according to a physical size, negotiation may determine a consistent display size for each display area.

Then, at 206, the consistent screen sharing program 110A, 110B sizes the display area of each computing device, showing the shared screen data according to the negotiated display size. Sizing a display area may include directly setting or modifying the size of the display area, directing another program, such as software program 108 to set or modify the size of the display area, or directing a user to manually modify the size of the display area.

In at least one embodiment, the consistent screen sharing program 110A, 110B may maintain the size of the display area consistently, continuously, across all devices. Maintaining the size of the display area may be performed using known methods, such as overriding ordinary user control of windows, frequently resizing a window to the negotiated display size, or using an overlay according to an operating system API. In an alternate embodiment, the consistent screen sharing program 110A, 110B may, after sizing the display area to the negotiated display size, return control of the display area's size to the user.

In a further embodiment, the consistent screen sharing program 110A, 110B may obscure parts of the display that are not in the display area, by, for example, placing a black overlay on parts of the display that are not in the display area.

In at least one embodiment, the consistent screen sharing program 110A, 110B may further set other display aspects to match negotiated criteria. For example, if a negotiated brightness determines that brightness should be set to 300 nits across all devices, the consistent screen sharing program 110A, 110B may set brightness across all devices to 300 nits, and may further maintain brightness at 300 nits.

In at least one embodiment, sizing a display area may include resizing that display area. Resizing a display area may, for example, occur after renegotiation occurs. Alternatively, resizing may occur at a high frequency, such as 60 times per second.

In at least one embodiment, if a device, such as device B in the above example, has a non-rectangular display, the shared screen data may be displayed on the largest rectangular portion of that screen, or on another rectangular portion of the screen that effectively fits the shared screen data. Alternatively, the shared screen data may fill the device's screen as though it were a complete rectangle, accepting that portions of that rectangle may not be visible to viewers looking at device B's screen.

In a further embodiment, if the negotiated display size is larger than a given device's screen, the display area on that device may be shrunk to fit the screen. Alternatively, the display area on that device may be the full screen, and the shared screen data may be cropped to fit the screen. Further, the consistent screen sharing program 110A, 110B may allow the user using the given device to scroll, pan, or move the display area to show parts of the screen removed by the cropping.

Figure 3:
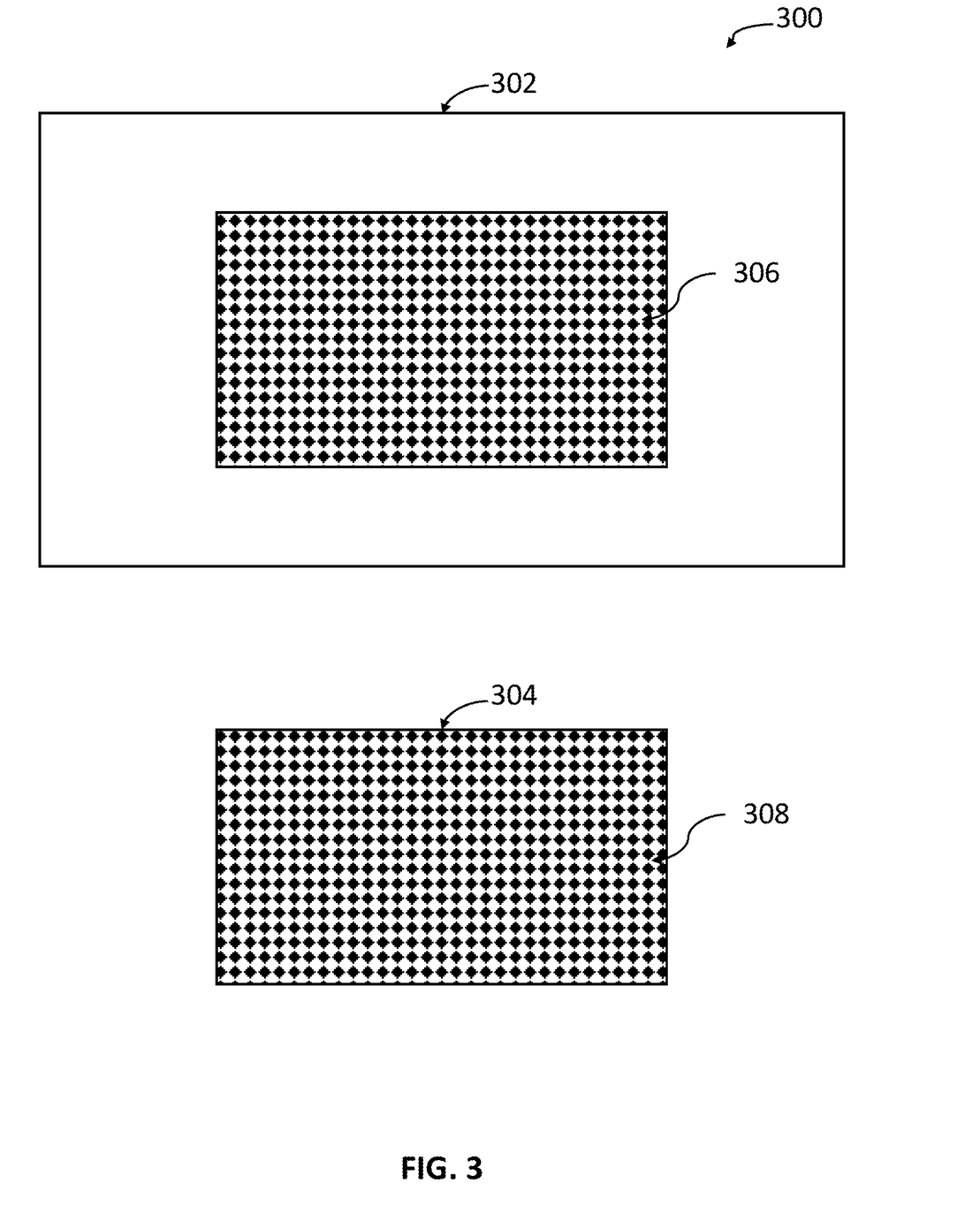
FIG. 3 illustrates two screens displaying fixed, consistently-sized screen sharing display areas according to at least one embodiment.

FIG. 3 illustrates two screens displaying fixed, consistently-sized screen sharing display areas according to at least one embodiment. Screen 302 and screen 304 may be two different screens corresponding to two different devices each participating in a call. Display area 306 on screen 302 and display area 308 on screen 304 may be two different display areas that are each sized consistently according to a negotiated physical size or a negotiated pixel size.

In an alternate embodiment, display area 306 and display area 308 may be sized consistently according to a negotiated relative portion of screen width. For example, since the width of display area 308 is the full width of screen 304, display area 306 may be sized so that its width is the full width of screen 302. The height of display area 306 may, for example, maintain the aspect ratio of display area 308, or may follow other negotiation criteria. Alternatively, Display area 306 and display area 308 may each be sized to 60% of the height and 60% of the width of screen 302 and screen 304, respectively. If, for example, screen 302 and screen 304 had different aspect ratios, display area 306 and display area 308 may have different aspect ratios; in this case, the shared screen data may be stretched to fit, or may include a transparent background, a plain white or plain black background, or an algorithmically generated background.

In yet another embodiment, screen 302 and screen 304 may each display multiple display areas, and may size each of these screen areas according to consistent screen sharing.

It may be appreciated that FIG. 2 and FIG. 3 provide only illustrations of one implementation and do not imply any limitations with regard to how different embodiments may be implemented. Many modifications to the depicted environments may be made based on design and implementation requirements.

Figure 4:
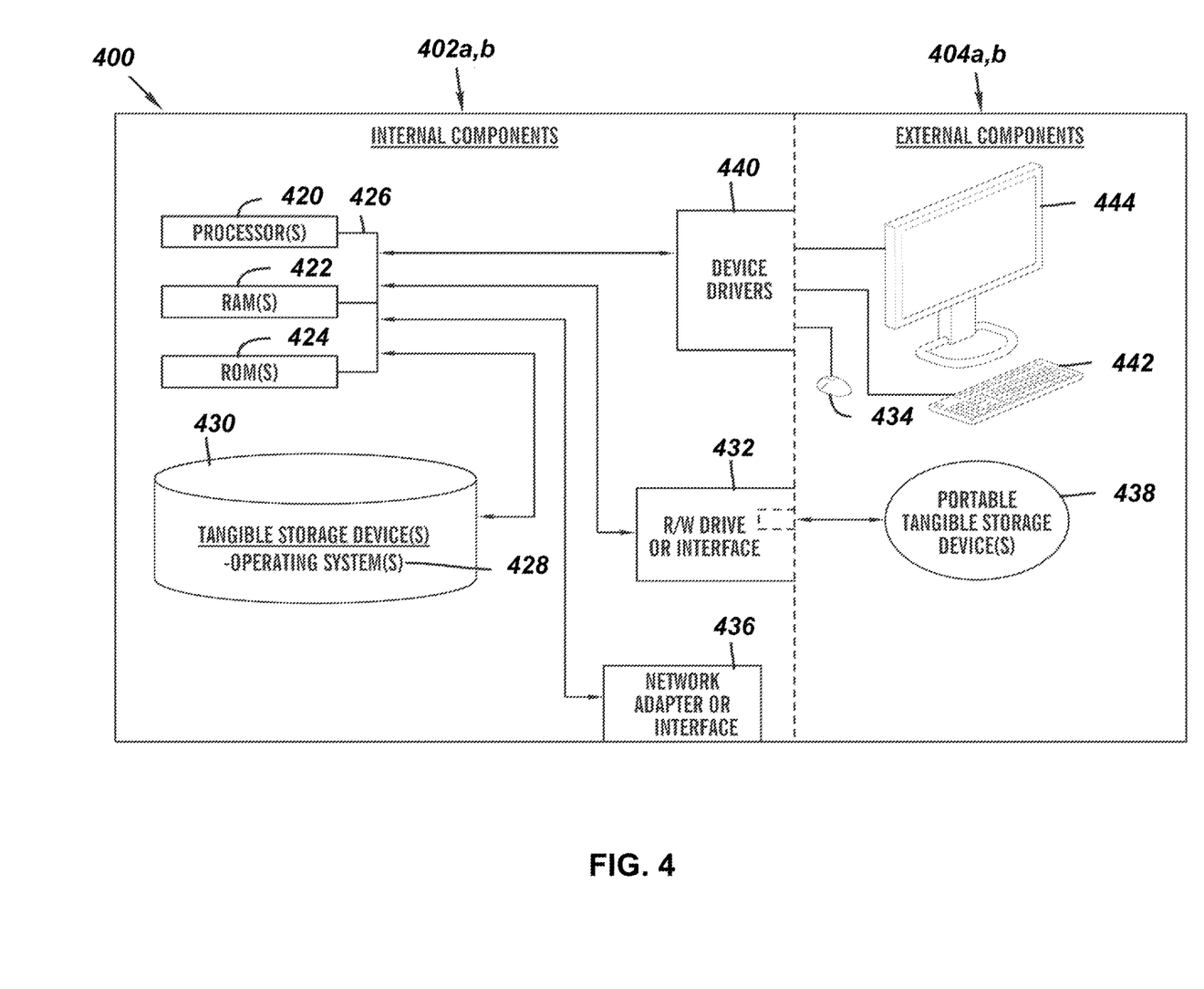
FIG. 4 is a block diagram of internal and external components of computers and servers depicted in FIG. 1 according to at least one embodiment.

FIG. 4 is a block diagram 400 of internal and external components of the client computing device 102. the server 112, and the networking device 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102, the server 112, and the networking device 120 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the consistent screen sharing program 110A in the client computing device 102 and the consistent screen sharing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the consistent screen sharing program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the consistent screen sharing program 110A in the client computing device 102 and the consistent screen sharing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the consistent screen sharing program 110A in the client computing device 102 and the consistent screen sharing program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
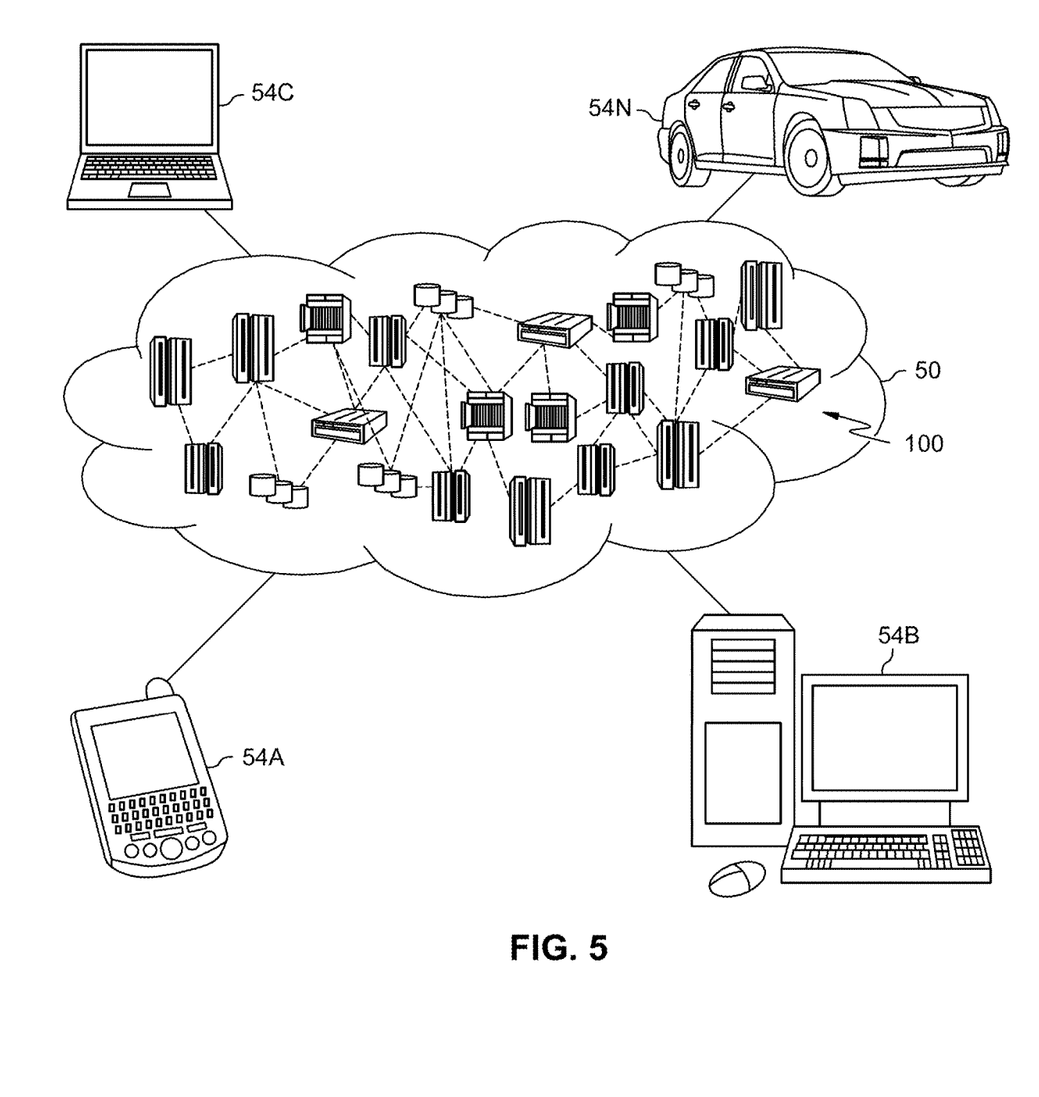
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
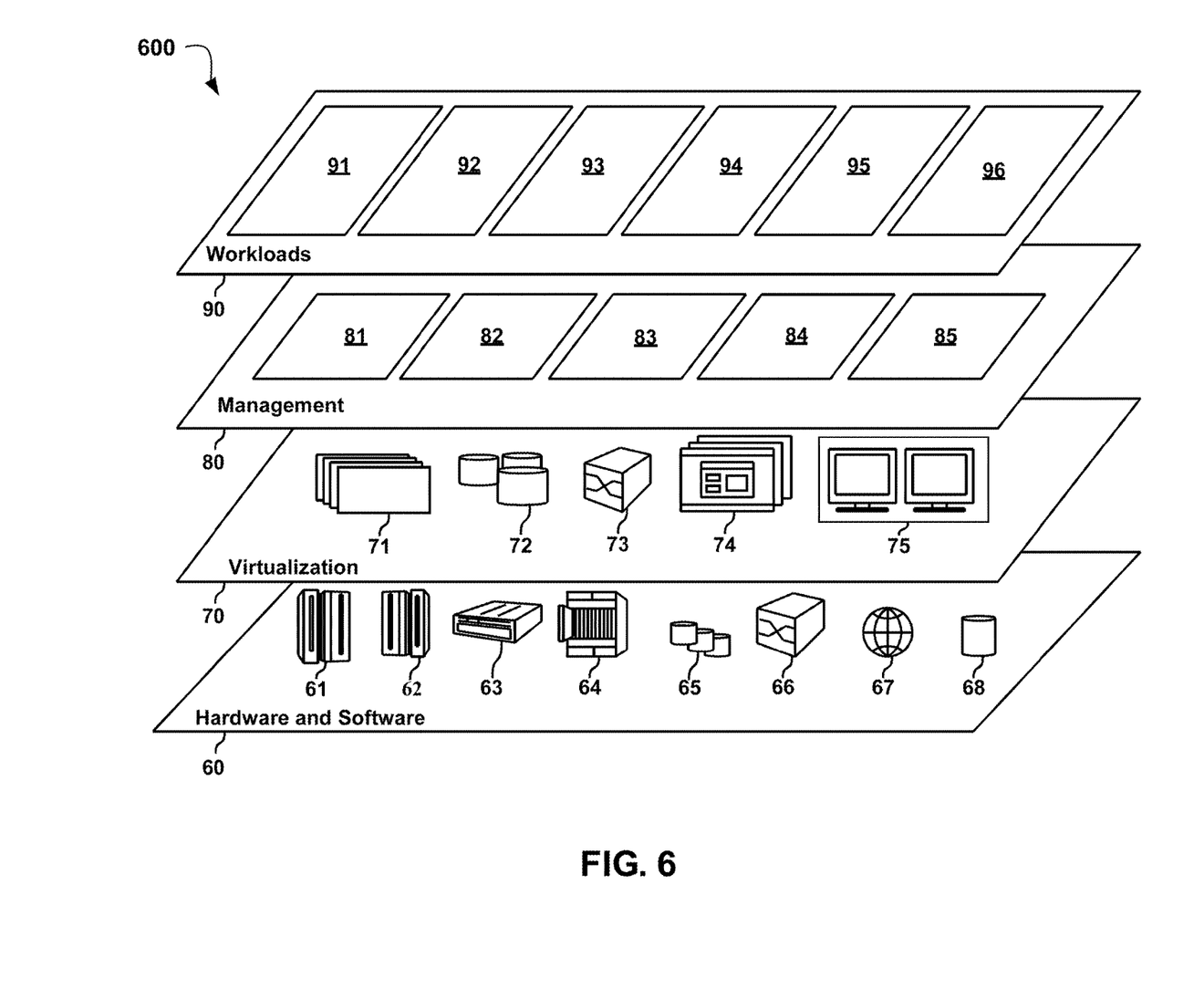
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and consistent screen sharing 96. Consistent screen sharing 96 may relate to sizing the display sizes of shared screen areas on multiple devices to match one another in size.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    initializing data pertaining to a video-enabled call, wherein the data includes negotiation criteria and screen specifications corresponding to a screen corresponding to each of a plurality of devices participating in the call;
    negotiating a consistent display size according to negotiation criteria and consistent with screen specifications;
    renegotiating the negotiated consistent display size, wherein the renegotiation is triggered by an action taken by a presenter; and
    sizing a display area to an actual display size on one or more screens corresponding to each of two or more devices from the plurality of devices participating in the call according to the negotiated display size.

2. The method of claim 1, further comprising:
    maintaining the actual display size of the display area on the one or more screens corresponding to each device in the two or more devices, according to the negotiated display size on each screen in the one or more screens.

3. The method of claim 1, wherein negotiation further comprises:
    negotiating one or more additional display sizes; and
    wherein the sizing further comprises:
        sizing each display area on additional screens corresponding to devices from the plurality of devices according to one of the additional negotiated display sizes.

4. The method of claim 1, wherein the negotiation criteria indicates negotiation according to physical width or physical height.

5. The method of claim 1, wherein the negotiation criteria indicates negotiation according to a relative portion of each respective screen's width, height, or area.

6. The method of claim 1, wherein the negotiation criteria indicates negotiation according to pixel width or pixel height.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
initializing data pertaining to a video-enabled call, wherein the data includes negotiation criteria and screen specifications corresponding to a screen corresponding to each of a plurality of devices participating in the call;
negotiating a consistent display size according to negotiation criteria and consistent with screen specifications;
renegotiating the negotiated consistent display size, wherein the renegotiation is triggered by an action taken by a presenter; and
sizing a display area to an actual display size on one or more screens corresponding to each of two or more devices from the plurality of devices participating in the call according to the negotiated display size.

8. The computer system of claim 7, further comprising:
maintaining the actual display size of the display area on the one or more screens corresponding to each device in the two or more devices, according to the negotiated display size on each screen in the one or more screens.

9. The computer system of claim 7, wherein negotiation further comprises:
negotiating one or more additional display sizes; and
wherein the sizing further comprises:
sizing each display area on additional screens corresponding to devices from the plurality of devices according to one of the additional negotiated display sizes.

10. The computer system of claim 7, wherein the negotiation criteria indicates negotiation according to physical width or physical height.

11. The computer system of claim 7, wherein the negotiation criteria indicates negotiation according to a relative portion of each respective screen's width, height, or area.

12. The computer system of claim 7, wherein the negotiation criteria indicates negotiation according to pixel width or pixel height.

13. A computer program product, the computer program product comprising:
one or more computer-readable tangible storage medium and program instructions stored on at least one of the one or more tangible storage medium, the program instructions executable by a processor capable of performing a method, the method comprising:
initializing data pertaining to a video-enabled call, wherein the data includes negotiation criteria and screen specifications corresponding to a screen corresponding to each of a plurality of devices participating in the call;
negotiating a consistent display size according to negotiation criteria and consistent with screen specifications;
renegotiating the negotiated consistent display size, wherein the renegotiation is triggered by an action taken by a presenter; and
sizing a display area to an actual display size on one or more screens corresponding to each of two or more devices from the plurality of devices participating in the call according to the negotiated display size.

14. The computer program product of claim 13, further comprising:
maintaining the actual display size of the display area on the one or more screens corresponding to each device in the two or more devices, according to the negotiated display size on each screen in the one or more screens.

15. The computer program product of claim 13, wherein negotiation further comprises:
negotiating one or more additional display sizes; and
wherein the sizing further comprises:
sizing each display area on additional screens corresponding to devices from the plurality of devices according to one of the additional negotiated display sizes.

16. The computer program product of claim 13, wherein the negotiation criteria indicates negotiation according to physical width or physical height.

17. The computer program product of claim 13, wherein the negotiation criteria indicates negotiation according to a relative portion of each respective screen's width, height, or area.

* * * * *